United States Patent [19]

Nagai et al.

[11] Patent Number: 5,292,824
[45] Date of Patent: Mar. 8, 1994

[54] PROCESS FOR PRODUCING A POLYACETAL RESIN COMPOSITION

[75] Inventors: Satoshi Nagai; Masao Hasegawa; Hiroshi Mimura; Makoto Kobayashi, all of Hiratsuka, Japan

[73] Assignee: Mitsubishi Gas Chemical Company, Inc., Tokyo, Japan

[21] Appl. No.: 29,412

[22] Filed: Mar. 10, 1993

[30] Foreign Application Priority Data

Mar. 19, 1992 [JP] Japan .................................. 4-063848

[51] Int. Cl.$^5$ .......................... C08L 59/00; C08L 61/02
[52] U.S. Cl. ..................................... 525/399; 525/398; 525/452; 525/453; 525/456; 525/56; 524/387; 524/386
[58] Field of Search ............... 525/399, 398, 452, 453, 525/456, 56; 524/387, 386

[56] References Cited

U.S. PATENT DOCUMENTS 3,622,527 11/1971 Dieterich ............................ 525/453
5,183,860 2/1993 Kashihara ........................... 525/399

FOREIGN PATENT DOCUMENTS 0116456 8/1984 European Pat. Off. .
0350223 1/1990 European Pat. Off. .
0449605 10/1991 European Pat. Off. .
1005721 9/1957 Fed. Rep. of Germany .

Primary Examiner—James J. Seidleck
Assistant Examiner—Mark L. Warzel
Attorney, Agent, or Firm—Wenderoth, Lind & Ponack

[57] ABSTRACT

There is disclosed a process for producing a polyacetal resin composition, which comprises mixing (A) a polyacetal resin, (B) a thermoplastic polyurethane elastomer and (B) a polyhydric alcohol having at least three hydroxyl groups in the molecule, in molten state with shear, at a temperature of 180° to 250° C. The polyacetal resin composition produced by the above process gives injection-molded shaped articles showing various well-balanced physical properties such as tensile strength and elongation at break at weld portions, and impact resistance.

7 Claims, No Drawings

PROCESS FOR PRODUCING A POLYACETAL RESIN COMPOSITION

BACKGROUND OF THE INVENTION

1. Field of the Invention

This invention relates to a process for producing a novel polyacetal resin composition which is conveniently used as a material for such parts as clips, springs, gears, bearings, cams, levers and the like in electrical and electronical machines, office machines, automobiles, industrial machines, toys and/or sports goods, etc.

2. Prior Arts

Polyacetal has found wide usages as an engineering plastics excelling in mechanical properties, electrical properties and chemical properties such as chemical resistance. Its usages are limited, however, because of its inferior impact resistance compared to that of other engineering plastics. As a method to improve impact resistance, i.e., impact strength, of polyacetal, a means to blend a thermoplastic polyurethane elastomer with polyacetal has been proposed [cf. Japanese Patent Publications Nos. 24,583/1963 and 1,522/1964; U. K. Patent No. 1,017,244; Japanese KOKAI (Laid-Open) Patent Publications Nos. 145,243/1984 (corresponding to U.S. Pat. No. 4,978,725), 155,452/1984 (corresponding to European Patent No. 117,664), 155,453/1984 (corresponding to U.S. Pat. No. 4,804,716), 191,751/1984, 19,652/1986 (corresponding to U.S. Pat. No. 4,707,525), 56,553/1988 (corresponding to U.S. Pat. No. 4,780,498) and 280,758/88 (corresponding to European Patent No. 290,761)]. Some of those proposals have already been put to practice.

However, shaped articles formed by injection molding such compositions of polyacetal blended with thermoplastic polyurethane elastomers generally exhibit, while they do show improved impact resistance, reduced tensile strength and elongation at break at weld portions, providing one reason for easy breakage of the injection-molded articles by external forces. Hence improvements in that aspect are in demand as well as still greater improvement in impact resistance.

There are also other proposals for a method of polymerizing an isocyanate compound with long chain polyol in the presence of polyacetal [Japanese KOKAI (Laid-Open) Patent Nos. 182,328/1988 (corresponding to U.S. Pat. No. 4,946,906) and 196,649/1988 (corresponding to European Patent No. 277,630)]. Alloys of polyacetal and polyurethane elastomers proposed therein exhibit better impact strength compared to the compositions obtained by simply melt-mixing polyacetal and polyurethane elastomer.

SUMMARY OF THE INVENTION

An object of the present invention is to provide a process for producing a novel polyacetal resin composition.

A more specific object of the present invention is to provide a process for producing a novel polyacetal resin composition whose basic components are a polyacetal resin and a thermoplastic polyurethane elastomer, which gives injection-molded shaped articles showing well-balanced various physical properties such as tensile strength and elongation at break at weld portions, and impact resistance.

According to the present invention, there is provided a process for producing a polyacetal resin composition, which comprises mixing (A) a polyacetal resin, (B) a thermoplastic polyurethane elastomer and (C) a polyhydric alcohol having at least three hydroxyl groups in the molecule, in a molten state with shear, at a temperature of 180° to 250° C., whereby the above objects are accomplished.

According to one preferred embodiment of the present invention, the polyacetal resin (A), the thermoplastic polyurethane elastomer (B) and the polyhydric alcohol (C) are used at such weight ratios as satisfy the two equations below:

$$99/1 \leq (A)/(B) \leq 40/60$$

$$0.01 \leq \frac{(C)}{(A) + (B)} \times 100 \leq 10.$$

Injection-molded articles from the novel polyacetal resin composition, provided by the process of the present invention, exhibit superior tensile strength and elongation at break at weld portions in comparison with those of injection-molded articles from polyacetal resin compositions consisting essentially of a polyacetal resin (A) and a thermoplastic polyurethane elastomer (B) and, furthermore, in many cases exhibit remarkably high impact resistance. Therefore, the novel polyacetal resin composition provided by the process of this invention exhibits an excellent balance, among the above-mentioned physical properties.

The present invention is described in further details hereafter, whereby the objects and advantages of the invention will become all the more clear.

DETAILED DESCRIPTION OF THE INVENTION

The polyacetal resin (A) used in the present invention contains oxymethylene units as the chief recurring unit, preferably in an amount of at least 50 mol %. Such polyacetal resin (A) includes an oxymethylene homopolymer composed substantially of an oxymethylene unit, which can be prepared from formaldehyde or trimer thereof (trioxane); an oxymethylene copolymer containing up to 20% by weight of $C_2$–$C_8$ hydroxyalkylene units, whose hydrogen may be substituted by halogen, which can be prepared from formaldehyde or trimer thereof (trioxane) and $C_2$–$C_8$ cyclic ether such as ethylene oxide, epichlorohydrin, 1,3-dioxolane, 1,3,5-trioxepane, formal of glycol and formal of diglycol; an oxymethylene block copolymer or graft copolymer which contains the above oxymethylene homopolymer or copolymer as the main structure, and further contains block chains or terminal structure other than oxymethylene unit; and a crosslinked oxymethylene polymer having crosslinked structure.

Some of commercially available resins can be used as the polyacetal resin (A), or, the resins used as the polyacetal resin (A) can be prepared by methods known per se.

It is preferred that the polyacetal resin (A) has a melt index (MI) of at least 0.01, in particular from 0.1 to 100, as measured at 190° C. under a load of 2.16 kg according to ASTM-D 1238.

Commercial polyacetal resins are available in a form of powder, flake or pellet, any of which forms can be used in the present invention.

Commercial polyacetal resins are incorporated with stabilizers or antioxidants so that their decomposition under the actions of oxygen, heat, water and light, etc. is inhibited. Typical examples of such additives include melamine, melamine resin, cyanoguanidine, polyamide, hindered phenol and hindered amine. The additives as stabilizers or anti-oxidants which are blended in commercial polyacetal resins effectively function to improve heat stability of the composition of the present invention and, in most cases, do not adversely affect or provide hindrances to the effect of the present invention. Accordingly, polyacetal resins blended with those additives are used with preference.

The thermoplastic polyurethane elastomer (B) used in the present invention can be obtained through a reaction of a polyisocyanate with a polyol having hydroxyl groups at its molecular terminals by a method known per se. The elastomer contains urethane linkages in the polymer main chain. In the occasion of reacting polyisocyanate with polyol, further a chain-extending agent may be used. In the above reaction, preferred molar ratio (NCO/OH) of the isocyanate group to the hydroxyl group ranges from 0.5 to 2, more preferably from 0.9 to 1.5.

As the polyisocyanates, $C_4$ to $C_{50}$, in particular $C_6$ to $C_{40}$, aromatic, alicyclic or aliphatic diisocyanates are preferred. More specifically, preferred diisocyanates include: diphenylmethane-4,4'-diisocyanate, tolylene diisocyanate, naphthylene diisocyanate, diphenyl diisocyanate, p,p'-benzidine diisocyanate, durene diisocyanate, 1,6-hexamethylene diisocyanate, lysine diisocyanate, 4,4'-methylene-bis-(cyclohexylisocyanate), m-xylylene diisocyanate and p-xylylene diisocyanate.

As polyisocyanates, diphenylmethane-4,4'-diisocyanate, tolylene diisocyanate, 1,6-hexamethylene diisocyanate, m-xylylene diisocyanate and isophorone diisocyanate are particularly preferred.

The polyol component constituting the thermoplastic polyurethane elastomer (B) can be suitably selected from polyether diol, polyester diol, polyetherester diol and polycarbonate diol of number average molecular weight ranging preferably from 500 to 5,000, more preferably from 1,000 to 3,000.

Specific preferred examples of the polyether diol include polyethylene glycol, polypropylene glycol, polytetramethylene glycol and polyhexamethylene glycol.

The polyether diol can be obtained by ring-opening polymerization of $C_2-C_{12}$ cyclic ether such as ethylene oxide, propylene oxide and tetrahydrofuran.

The polyester diol has the main structure of polyester and hydroxyl groups at two terminals of the molecular chain. It can be prepared from dihydric alcohol and dicarboxylic acid by esterification or ester-interchange reaction. It is also possible to produce a polyester diol by ring-opening polymerization of lactone. As the preferred dihydric alcohol, $C_2-C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentylglycol, 2-methylpropanediol, 2-methyl-1,8-octanediol, nonanediol and 1,10-decanediol can be used. And, as the dicarboxylic acid, $C_4-C_{12}$ aliphatic or $C_8-C_{12}$ aromatic dicarboxylic acid such as glutaric acid, adipic acid, pimelic acid, suberic acid, sebacic acid, terephthalic acid and isophthalic acid are preferably used. Also as the lactone, $C_4-C_{10}$ lactone such as caprolactone, propiolactone and varelolactone can be given as preferred examples.

The polyetherester diol has an ester group and an ether group in its main chain and hydroxyl groups at the two terminals. Such polyetherester diol can be obtained, for example, by reacting the above polyether diol with a dicarboxylic acid anhydride to convert the terminal group to a carboxyl group, and further reacting it with cyclic ether.

As the dicarboxylic acid anhydride, those having 4 to 15 carbons such as phthalic anhydride, maleic anhydride, succinic anhydride and tetrahydrophthalic anhydride are preferably used.

As the cyclic ether, those having 2 to 7 carbon atoms such as ethylene oxide, propylene oxide and tetrahydrofuran can be preferably used.

The polycarbonate diol has a carbonate group in its main chain and two hydroxyl groups at its molecular chain terminals. The polycarbonate diol can be obtained through a reaction of a dihydric alcohol or phenol with diphenyl carbonate or phosgene. As the dihydric alcohol, $C_2-C_{12}$ alkanediol such as ethylene glycol, propylene glycol, 1,4-butanediol, 1,3-butanediol, 1,5-pentanediol, 3-methyl-1,5-pentanediol, 1,6-hexanediol, neopentyl glycol, 2-methylpropanediol, 2-methyl-1,8-octanediol, nonanediol and 1,10-decanediol can be used as preferred examples.

As the chain-extending agent which may serve as a constituent of the thermoplastic polyurethane elastomer (B), aliphatic, alicyclic or aromatic diol or diamines having number average molecular weight of less than 500, preferably from 60 to 300, are used. Preferred examples of such diols include ethylene glycol, 1,3-propylene glycol, 1,2-propylene glycol, 1,4-butanediol, 1,5-pentanediol, 1,6-hexanediol, 1,4-cyclohexanediol, hydroquinonediethylolether, 1,4-bishydroxyethylbenzene, resorcinediethylolether and hydrogenated bisphenol A. As the diamine, ethylenediamine, hexamethylenediamine, xylylenediamine and 4,4'-diaminodiphenylmethane can be preferably used.

The amount of the thermoplastic polyurethane elastomer (B) preferably falls within the range relative to that of (A) polyacetal resin, as defined in terms of weight ratio, $99/1 \leq (A)/(B) \leq 40/60$, in particular, $95/5 \leq (A)/(B) \leq 50/50$. The (A)/(B) ratio within the above-specified range contributes to the favorable balance between impact strength and tensile strength as well as elongation at break of weld portions of injection-molded articles of polyacetal resin compositions prepared by the process of the present invention, and is, therefore, preferred.

The objects of the invention can also be attained when a thermoplastic polyurethane elastomer (B) is blended with a polyacetal resin (A) in advance, then further melt-mixed with a polyhydric alcohol (C) with shear. Therefore, it is permissible to select from commercially available polyacetal resins those adequately blended with a thermoplastic polyurethane elastomer. In such cases, it is also possible to further blend a thermoplastic polyurethane elastomer into such commercial polyacetal resin blends.

The polyhydric alcohol which is the component (C) contains at least three hydroxyl groups, preferably 3 to 50, in the molecule. The polyhydric alcohol (C) preferably contains 3 to 100 carbon atoms, in particular, 3 to 50 carbon atoms. More specifically, as the polyhydric alcohols (C), glycerine, trimethylolethane, trimethylolpropane, hexantriol, triethanolamine, diglycerine, pentaerythritol, tetraethanol ethylenediamine, methylglucosite, aromatic diamine-tetraethanol adduct, sorbitol, dipentaerythritol and cyclodextrin can be preferably used. Further, a polymer having hydroxy groups in its polymer chain such as phenoxy resin or polyvinyl alcohol can also be used.

While only one of such polyhydric alcohols (C) may be suitably selected, more than one may be selected according to the intended use of the composition resulting from the process of the present invention, which are mixed at a suitable ratio.

It is also possible to obtain a polyacetal resin composition of the present invention by the steps of melt-mixing the polyhydric alcohol or alcohols (C) with the polyacetal resin (A) in advance, then blending the system with thermoplastic polyurethane elastomer (B) and mixing the blend in molten state in the presence of shear stress.

The polyhydric alcohol (C) is preferably used in an amount satisfying the range defined by the following equations, relative to the amounts of the polyacetal resin (A) and the thermoplastic polyurethane elastomer (B) used:

$$0.01 \leq \frac{(C)}{(A) + (B)} \times 100 \leq 10,$$

in particular, $$0.05 \leq \frac{(C)}{(A) + (B)} \times 100 \leq 10.$$

Such a ratio of the polyhydric alcohol (C) is preferred for accomplishing the objects of the present invention.

A polyacetal resin composition of the present invention is prepared by mixing a polyacetal resin (A), a thermoplastic polyurethane elastomer (B) and a polyhydric alcohol (C), in molten state with shear, at a temperature of 180° to 250° C. Mixing under above-specified conditions contributes to the formation of a homogeneous polyacetal resin composition exhibiting well balanced physical properties.

More preferred mixing temperatures are 180° to 240° C. Mixing is carried out preferably with shearing rate of 1 to $10^4$ sec$^{-1}$, more preferably, 5 to $10^4$ sec$^{-1}$.

The mixing with shear under such conditions can be effected with an apparatus which is capable of heat-melting the polyacetal resin (A) and simultaneously exerting sufficient shear.

As such an apparatus, for example, a monoaxial extruder, claw-type twin screw co-rotating extruder, claw-type twin screw counter-rotating extruder, non- or incomplete claw-type twin screw counter-rotating extruder, cokneader, disc pack, an internal mixer such as Banbury mixer may be used, and no special facilities are required. Of those devices, particularly claw-type twin-screw co-rotating extruder, non- or incomplete claw-type twin screw counter-rotating extruder and cokneader exhibit sufficient shear-mixing ability, and hence can be conveniently used.

The mixing time depends on the resin temperature within the apparatus and the shear mixing power of the apparatus in an individual case and cannot be definitely specified. Normally, however, the time ranges from 5 seconds to 30 minutes.

The mechanism through which the advantages of the present invention are manifested has not yet been fully clarified, while it is presumed based on the results of various experiments that they are attributable to the formation of cross-linked structure upon reaction of the polyhydric alcohol (C) with the thermoplastic polyurethane elastomer (B). For example, still better results are obtained when 0.05% by weight to the total weight of the polyacetal resin (A), the thermoplastic polyurethane elastomer (B) and the polyhydric alcohol (C) of a urethanation catalyst is added to these three components, examples of the urethanation catalyst including triethylamine, tributylamine, triethanolamine, N-ethylmorpholin, dibutyldilauryltin, stannous octylate and lead octylate. This fact allows an assumption that the amines or organometal compounds added in those experiments do not act as urethanation catalyst but rather act as urethane-decomposing catalyst to produce a polymer having isocyanate group, at the same time promoting the cross-linking reaction of polyhydric alcohol with said polymer.

According to the invention, besides the polyacetal resin (A), thermoplastic polyurethane elastomer (B) and polyhydric alcohol (C), for example, above-exemplified amines or organometal compounds which are effective urethanation catalyst can be added. Preferred amount of such compounds to be added ranges from 0.0001 to 0.1% by weight to the total weight of the polyacetal resin (A), thermoplastic polyurethane elastomer (B) and polyhydric alcohol (C), in particular, from 0.001 to 0.1% by weight.

According to the present invention, if necessary, other known additives such as a stabilizer, ultraviolet absorber, releasing agent, lubricant, pigment, glass fiber, carbon fiber, and the like may be added each in a suitable amount, within the range not detrimental to the physical properties of the resultant polyacetal resin composition.

The polyacetal resin compositions, provided in accordance with the process of the present invention, exhibit well balanced physical properties such as tensile strength and elongation at break at weld portions of injection-molded articles therefrom, and impact strength, etc. Consequently, the polyacetal resin compositions of the present invention are excellent as injection-molding materials of electric, electronic and automobile parts. Moreover, since the process of the present invention does not require special equipments, it allows very easy production of the polyacetal resin compositions on an industrial scale and at low costs.

Hereinafter the invention is explained in further details, referring to Examples and Comparative Examples, it being understood that the invention is not limited thereto.

In the following Examples and Comparative Examples, the methods of preparation of test specimens and of evaluation of the respective properties were as follows.

(1) Specimens for the tension test and Izod impact test:

The specimens were molded with an injection molding machine (supplied by Sumitomo Heavy Industries, Ltd) at a cylinder temperature of 190° C., mold temperature of 40° C. and a molding cycle of 60 seconds.

(2) Melt index (MI):

Measured at a temperature of 190° C. under a load of 2.16 kg according to ASTM D1238.

(3) Tension test of weld portions:

An autograph (supplied by Shimadzu Corp.) was used. Specimens were measured for the tensile strength and elongation at break of weld portions according to the method prescribed in ASTM D638.

(4) Izod impact test:

Using an Izod impact tester (supplied by Toyo Seiki Seisakusho), notched Izod impact strength of the specimens was measured according to the method of ASTM D256.

EXAMPLE 1

80 Parts by weight (8 kg) of polyacetal (supplied by Mitsubishi Gas Chemical Company, Inc., copolymer type, sold under the trade name: Yupital, MI=9), 20 parts by weight (2 kg) of a polyester-type thermoplastic polyurethane elastomer (TPU-1) and 1 part by weight (0.1 kg) of pentaerythritol as polyhydric alcohol were charged into a super-mixer, and mixed for 5 minutes in the accepted manner. Then the system was mixed in molten state in a claw-type twin screw co-rotating extruder at a melting temperature (resin temperature) of 220° C. and residence time of 2 minutes. The shearing rate was 135 sec$^{-1}$. The melt was subsequently pelletized in the accepted manner to provide pellets of the polyacetal resin composition.

Test specimens were prepared from the pellets by injection molding, and subjected to the various tests as specified in the foregoing. The resin had a melt index of 4.2, tensile strength of 352 kg/cm$^2$ and tensile elongation of 23% at weld portions of the test specimens, and an Izod impact strength of 20 kg.cm/cm.

EXAMPLES 2 to 11

Example 1 was repeated except that the kind and amount of the polyacetal resin, the polyhydric alcohol and the thermoplastic polyurethane elastomer and the melting temperature were changed as indicated in Tables 1 and 2 for each run. The resultant test specimens were subjected to the evaluation tests with the results as shown in Tables 1 and 2.

In the following Tables,
POM-1: Polyacetal resin of MI=9
POM-2: Polyacetal resin of MI=30
TPU-1: Polyester-type thermoplastic polyurethane elastomer, supplied by Dainippon Ink and Chemicals, Inc., sold under the trade name: PANDEX T1180.
TPU-2: Polyether-type thermoplastic polyurethane elastomer, supplied by Kuraray Co., Ltd, sold under the trade name: KURAMILON U9180.
Polyhydric alcohol-1: Glycerine.
Polyhydric alcohol-2: Trimethylolethane.
Polyhydric alcohol-3: Pentaerythritol
Polyhydric alcohol-4: Dipentaerythritol.
Polyhydric alcohol-5: Cyclodextrin.

TABLE 1

| Item | Unit | Example 2 | Example 3 | Example 4 | Example 5 | Example 6 |
|---|---|---|---|---|---|---|
| POM-1 | wt. part | 80 | 80 | 80 | 80 | 80 |
| TPU-1 | wt. part | 20 | | 20 | 20 | 20 |
| TPU-2 | wt. part | | 20 | | | |
| Polyhydric alcohol-1 | wt. part | 1 | 5 | | | |
| Polyhydric alcohol-2 | wt. part | | | 2 | | |
| Polyhydric alcohol-4 | wt. part | | | | 0.5 | |
| Polyhydric alcohol-5 | wt. part | | | | | 1 |
| Melting temp. | °C. | 210 | 210 | 210 | 210 | 210 |
| Melt index | g/10 min. | 4.5 | 6.1 | 4.6 | 5.5 | 5.9 |
| Weld tensile strength | kg/cm$^2$ | 359 | 322 | 365 | 355 | 360 |
| Weld tensile elongation | % | 14 | 13 | 18 | 12 | 13 |
| Izod impact strength | kg · cm/cm | 16 | 15 | 17 | 19 | 16 |

TABLE 2

| Item | Unit | Example 7 | Example 8 | Example 9 | Example 10 | Example 11 |
|---|---|---|---|---|---|---|
| POM-1 | wt. part | 90 | 70 | 50 | 80 | |
| POM-2 | wt. part | | | | | 80 |
| TPU-1 | wt. part | 10 | 30 | 50 | 20 | |
| TPU-2 | wt. part | | | | | 20 |
| Polyhydric alcohol-2 | wt. part | | | | | 0.5 |
| Polyhydric alcohol-3 | wt. part | 1 | 0.5 | 0.5 | | 1 |
| Polyhydric alcohol-4 | wt. part | | | | 0.01 | |
| Melting temp. | °C. | 200 | 200 | 200 | 240 | 180 |
| Melt index | g/10 min. | 7.2 | 4.1 | 3.8 | 7.1 | 15.8 |
| Weld tensile strength | kg/cm$^2$ | 433 | 318 | 227 | 354 | 352 |
| Weld tensile elongation | % | 21 | 19 | 34 | 8 | 12 |
| Izod impact strength | kg · cm/cm | 19 | 35 | >100 | 17 | 15 |

COMPARATIVE EXAMPLES 1 to 4

Example 1 was repeated except that the blend ratios of the three components (A), (B) and (C) were changed as shown in Table 3, i.e., blending of (C) polyhydric alcohol was omitted, and that the melting temperature was changed as indicated in Table 3. The test specimens were subjected to the same evaluation tests as in Example 1, with the results as shown in Table 3.

TABLE 3

| Item | Unit | Comp. Example 1 | Comp. Example 2 | Comp. Example 3 | Comp. Example 4 |
|---|---|---|---|---|---|
| POM-1 | wt. part | 100 | 90 | 80 | 70 |
| TPU-1 | wt. part | 0 | 10 | 20 | 30 |
| Polyhydric alcohol-1 | wt. part | 0 | 0 | 0 | 0 |
| Melting temp. | °C. | 200 | 200 | 200 | 180 |
| Melt index | g/10 min. | 9.0 | 8.7 | 6.5 | 5.8 |
| Weld tensile strength | kg/cm$^2$ | 587 | 426 | 348 | 302 |
| Weld tensile elongation | % | 9 | 6 | 5 | 5 |
| Izod impact strength | kg · cm/cm | 6 | 7 | 15 | 27 |

COMPARATIVE EXAMPLE 5

80 Parts by weight (8 kg) of polyacetal (supplied by Mitsubishi Gas Chemical Company, Inc., copolymer-type, tradename: Yupital, MI=9), 20 parts by weight (2 kg) of a polyester-type thermoplastic polyurethane elastomer and 1 part by weight (0.1 kg) pentaerythritol as polyhydric alcohol were charged into a super-mixer, and mixed for 5 minutes under identical conditions with those employed in Example 1. Then, without the intervening melt-mixing treatment with shear, the mixture was injection-molded as in Example 1 to provide test specimens. The specimens were subjected to the same evaluation tests as those conducted in Example 1, with the results which are indicated in Table 4.

COMPARATIVE EXAMPLE 6

Example 1 was repeated except that the resin temperature in the melt-mixing with shear was changed from 220° C. to 170° C. The resultant test specimens were subjected to the same evaluation tests as those conducted in Example 1, with the results as indicated in Table 4.

COMPARATIVE EXAMPLE 7

When the melt-mixing with shear and pelletization were conducted in the identical manner with Example 1, except that the resin temperature in the melt-mixing with shear was changed from 220° C. to 260° C., the system foamed violently, the resin was decomposed and the pelletized resin composition was colored brown.

TABLE 4

| Item | Unit | Comp. Example 5 | Comp. Example 6 |
| --- | --- | --- | --- |
| POM-1 | wt. part | 80 | 80 |
| TPU-1 | wt. part | 20 | 20 |
| Polyhydric alcohol-3 | wt. part | 1 | 1 |
| Melting temp. | °C. | — | 170 |
| Melt index | g/10 min. | 6.5 | 5.8 |
| Weld tensile strength | kg/cm² | 343 | 340 |
| Weld tensile elongation | % | 3 | 5 |
| Izod impact strength | kg · cm/cm | 11 | 14 |

We claim:

1. A process for producing a polyacetal resin composition, which comprises mixing a polyacetal resin (A), a thermoplastic polyurethane elastomer (B) and a polyhydric alcohol (C) selected from the group consisting of glycerine, trimethylolethane, trimethylolpropane, hexantriol, triethanolamine, diglycerine, pentaerythritol, tetraethanol ethylenediamine, methylglucosite, aromatic diamine-tetraethanol adduct, sorbitol, dipentaerythritol, cyclodextrin, phenoxy resin and polyvinyl alcohol, in molten state with shear, at a temperature of 180° to 250° C., the polyacetal resin (A), the thermoplastic polyurethane elastomer (B) and the polyhydric alcohol (C) being used at such weight ratios as satisfy the equations below:

$$99/1 \leq (A)/(B) \leq 40/60$$

$$0.01 \leq \frac{(C)}{(A) + (B)} \times 100 \leq 10.$$

2. A process as defined in claim 1, in which the polyacetal resin (A) has a melt index of at least 0.01.

3. A process as defined in claim 1, in which the thermoplastic polyurethane elastomer (B) is an elastomer formed through reaction of polyisocyanate with polyol at NCO/OH molar ratio of 0.5 to 2.

4. A process as defined in claim 1, in which the polyhydric alcohol (C) has 3 to 100 carbon atoms and contains 3 to 50 hydroxyl groups in the molecule.

5. A process as defined in claim 1, in which the mixing is carried out with shearing rate of 1 to $10^4$ sec$^{-1}$.

6. A polyacetal resin composition produced by the process as defined in claim 1.

7. An injection-molded article of the polyacetal resin composition of claim 6.

* * * * *

UNITED STATES PATENT AND TRADEMARK OFFICE
CERTIFICATE OF CORRECTION

PATENT NO. : 5,292,824
DATED : March 8, 1994
INVENTOR(S) : Satoshi NAGAI, Masao HASEGAWA, Hiroshi MIMURA and Makoto KOBAYASHI It is certified that error appears in the above-indentified patent and that said Letters Patent is hereby corrected as shown below:

Column 2, line 11, change "$99/1 \leq (A)/(B) \leq 40/60$" to --$99/1 \geq (A)/(B) \geq 40/60$--.

Column 4, in each of lines 38 and 39, change "$\leq$" to --$\geq$-- (all four occurrences).

In claim 1, at column 10, line 10, change "$99/1 \leq (A)/(B) \leq 40/60$" to --$99/1 \geq (A)/(B) \geq 40/60$--.

Signed and Sealed this

Twenty-first Day of November, 1995

Attest:

BRUCE LEHMAN

Attesting Officer

Commissioner of Patents and Trademarks